United States Patent

Middleby

[11] Patent Number: 5,228,964
[45] Date of Patent: Jul. 20, 1993

[54] CHLORINATING APPARATUS

[76] Inventor: Samuel R. Middleby, 7 Hood Crescent, Mermaid Waters, Queensland 4218, Australia

[21] Appl. No.: 831,859

[22] Filed: Feb. 5, 1992

[30] Foreign Application Priority Data

Feb. 7, 1991 [AU] Australia .................. PK4490
Jun. 20, 1991 [AU] Australia .................. PK6785

[51] Int. Cl.⁵ .................. C25B 9/00; C25B 15/08
[52] U.S. Cl. .................. 204/194; 204/242; 204/275; 204/278
[58] Field of Search .................. 204/128, 194, 275-278, 204/271, 242; 210/169; 362/96, 192

[56] References Cited

U.S. PATENT DOCUMENTS

| | | | |
|---|---|---|---|
| 1,226,732 | 5/1917 | White | 204/194 X |
| 3,222,269 | 12/1965 | Stanton | 204/278 X |
| 4,564,889 | 1/1986 | Bolson | 362/96 |
| 4,616,298 | 10/1986 | Bolson | 362/192 |
| 4,790,923 | 12/1988 | Stillman | 204/271 X |
| 4,891,115 | 1/1990 | Shishkin et al. | 204/272 X |
| 4,920,465 | 4/1990 | Sargent | 362/192 X |
| 4,997,540 | 3/1991 | Howlett | 204/271 |
| 5,059,296 | 10/1991 | Sherman | 204/271 X |

Primary Examiner—Donald R. Valentine
Attorney, Agent, or Firm—Spensley Horn Jubas & Lubitz

[57] ABSTRACT

Chlorinators are provided for use with saltwater swimming pools. The chlorinators do not require mains electric power and can be fitted to the pool without requiring any significant modification of the pool piping. One form of chlorinator (10) comprises a set of electrodes (18) which are connected to the output of an electric generator (16) which, in turn, is driven by the flow of water produced by the pool pump during filtration. The generator (16) has a shaft on which is mounted an impeller (15) which may be driven by the water flow through the pool return pipe outlet (13) or the water flow in the leaf basket cavity (14). In another form, a generator (36) is mechanically coupled to the pump motor (35). In yet another form of the invention, the electrodes (26) of a chlorinator (21) are mounted on the underside of a floating housing (24) and are powered from solar cells (23) located on the topside of the housing.

9 Claims, 3 Drawing Sheets

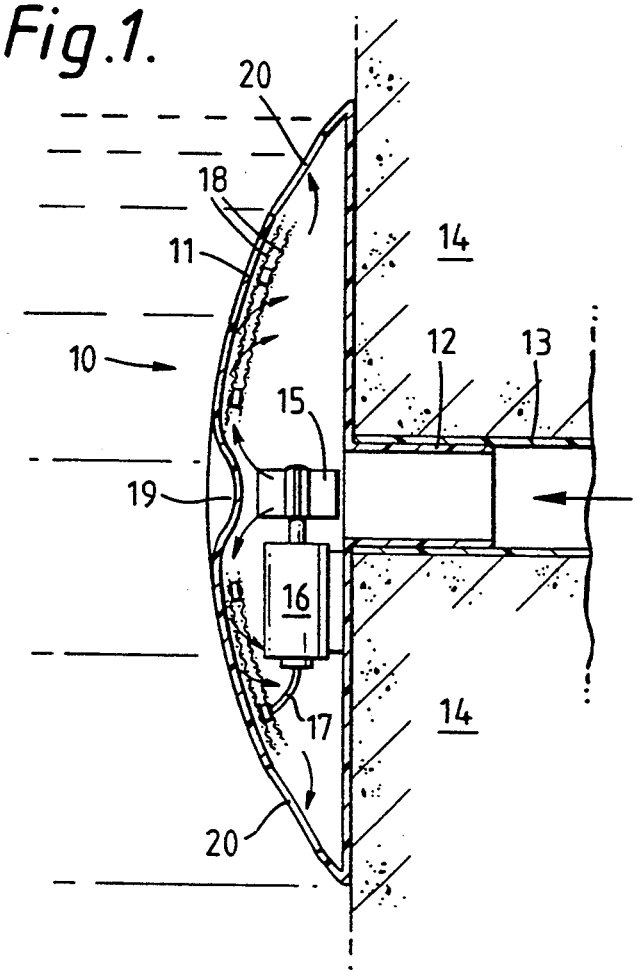
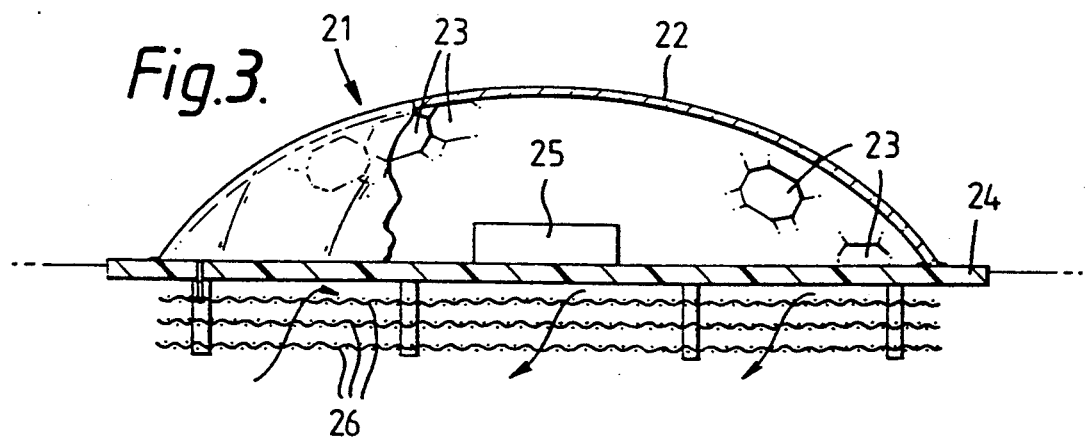

CHLORINATING APPARATUS

THIS INVENTION relates to improved chlorinating apparatus. In particular, the invention is directed to chlorinators which are easily retrofitted to pre-existing swimming pools or pools which have been newly converted to salt water, and which do not require connection to mains electric power.

Chlorinators are commonly used to produce chlorine in saltwater swimming pools. Such chlorinators normally comprise a pair of spaced electrodes in contact with the salt water of the swimming pool. In so-called "in-line" chlorinators, the electrodes are normally located in the return pipe from the pool filter to the pool, and these chlorinators operate only when the pool pump is being operated. In "convection" chlorinators, the electrodes are located in a conduit in fluid communication with the salt water of the pool such that an induced convection current flows through the conduit and conveys the generated chlorine to the pool. Convection chlorinators normally operate continuously at low power.

Both in-line and convection chlorinators are powered from mains power, typically through a voltage transformer. When sufficient voltage differential is applied to the spaced electrodes, chlorine is generated from the disassociation of the ionic saltwater solution between the electrodes.

Many owners of "freshwater" pools wish to convert to salt water in view of the lower maintenance and operating requirements of saltwater pools. However, conversion of a freshwater pool to salt water normally requires considerable alteration of the piping in order to retrofit a chlorinator, and hence conversion costs are quite high. Conventional chlorinators are also relatively expensive.

It is an object of the present invention to provide improved chlorinators which do not require connection to mains power, and which may be easily fitted to existing saltwater pools, or pools which have been newly converted to salt water.

In one broad form, this invention provides chlorinating apparatus suitable for use with a saltwater swimming pool having a pump for circulating water between the pool and a filter, the chlorinating apparatus comprising electrical generating means for providing an electrical output, the generating means being driven, in use, by the flow of water produced by the pump; and electrode means electrically connected to the electrical output of the electricity generating means for generating chlorine from the salt water.

In one embodiment, the chlorinating apparatus is a self-contained chlorinator having a housing adapted to be fitted to the outlet of the return pipe, i.e. the pipe returning water from the pump/filter to the pool. Typically, the chlorinator housing is provided with an inlet designed to couple to the outlet of the return pipe. The chlorinator housing has one or more outlets so that the water will pass through the chlorinator into the pool.

The electricity generating means typically comprises a sealed dynamo or similar electrical generator within the housing having a shaft on which is mounted an impeller or similar water turbine device. The impeller is located in the flow of water through the return pipe outlet. The flow of water from the return pipe spins the impeller, which in turn drives the dynamo to generate electrical power. The electricity generating means may generate either AC or DC voltage.

The electrode means may be of any suitable known materials and configuration. Typically, the electrode means comprises a plurality of spaced mesh electrodes, such as alloy-coated titanium electrodes, mounted in or on the housing so as to be located in the pool water in use.

The chlorinating apparatus of this embodiment has several advantages. First, the chlorinating apparatus need not be connected to a mains power supply and therefore does not consume any mains electricity. The chlorinator is powered from the kinetic energy of the water flow in the return pipe, which energy would otherwise be dissipated when the water is returned into the pool. Thus, the chlorinator significantly reduces the costs of operating and maintaining a swimming pool and is energy efficient.

Secondly, the chlorinator need not be plumbed into the pump and filter pipe network of the swimming pool, but is simply attached to the return water outlet. This enables the chlorinator to be quickly and easily installed in a swimming pool, and also enables freshwater swimming pools to be converted to salt water with minimum modification.

Thirdly, the chlorinator can be easily removed for cleaning.

Fourthly, the chlorinator operates automatically whenever the pump-driven filtration system is operating.

If there is more than one return outlet, more than one chlorinator may be used in a pool. Generally, the larger the pool, the more return water outlets are provided in the pool. Accordingly, more than one chlorinator may be used in such pools to supply the higher chlorine requirements.

In a second embodiment, the impeller of the generator is driven by the flow of water in the cavity or formation in which the leaf basket or pot is normally located. This is typically a cavity located adjacent the pool outlet, or skimmer box, having a removable lid.

The electrical generator is mounted on the topside of the lid and has a vertical shaft extending into the cavity. The impeller is mounted to the lower end of shaft. The electrical output of the generator is connected to spaced electrodes which are preferably supported from the underside of the lid and are located in the water within the cavity.

In use, when the pool pump is activated, water from the pool is circulated through the pool filtration system. Water from the pool passes through the skimmer box and the cavity which houses the leaf pot, to the pump and filter before returning to the pool. The flow of water through the leaf pot cavity impinges upon the impeller, causing the impeller shaft to rotate and thereby drive the generator. The electrical potential generated by the electrical generator is applied to the electrodes located in the water flow for electrolytic generation of chlorine from the salt water in a known manner.

In addition to the advantages of the first embodiment of the invention described above, this second embodiment has the advantage that it can be fully self-contained and mounted to the lid of the leaf pot cavity. Thus, the chlorinator can be installed simply by replacing the existing leaf pot lid with a lid on which the chlorinator is mounted.

In another form, the present invention provides chlorinating apparatus for use with a saltwater swimming pool, the chlorinating apparatus comprising solar-powered electricity generating means; and electrode means electrically connected to the output of the electricity generating means for generating chlorine from the salt water.

The solar-powered electricity generating means preferably comprises a plurality of solar cells. These may suitably be located on a housing which floats on the surface of the pool water and which carries the electrodes on its underside in contact with the salt water. Alternatively, the solar cells may be located outside the pool and connected by electric cables to electrodes in contact with the pool water.

The solar-powered chlorinating apparatus is self-contained, i.e. it need not be connected to mains power. Accordingly, the chlorinating apparatus significantly reduces the cost of operating and maintaining a swimming pool, and is highly efficient.

In a yet another form, this invention provides chlorinating apparatus suitable for use with a saltwater swimming pool having a filtration system including a pump driven by a motor, comprising electricity generating means adapted to be coupled to, and driven by, the motor, and electrode means electrically connected to the output of the electricity generating means for generating chlorine from the salt water.

Typically, the electricity generating means comprises an electrical generator which is mechanically coupled, either directly or indirectly, to the pump motor. The generator may be mounted on the pump motor and connected to electrodes located in the cavity or chamber which contains the hair and lint filter basket and is usually located adjacent the pump housing.

Again, this form of chlorinator does not require connection to mains power nor significant alteration of pool piping.

In order that the invention may be more fully understood and put into practice, preferred embodiments thereof will now be described with reference to the accompanying drawings, in which:

FIG. 1 is a schematic sectional elevation of the chlorinator of a first embodiment installed in a swimming pool;

FIG. 3 is a schematic sectional elevation of a chlorinator according to a third embodiment of this invention.

Figure 2:
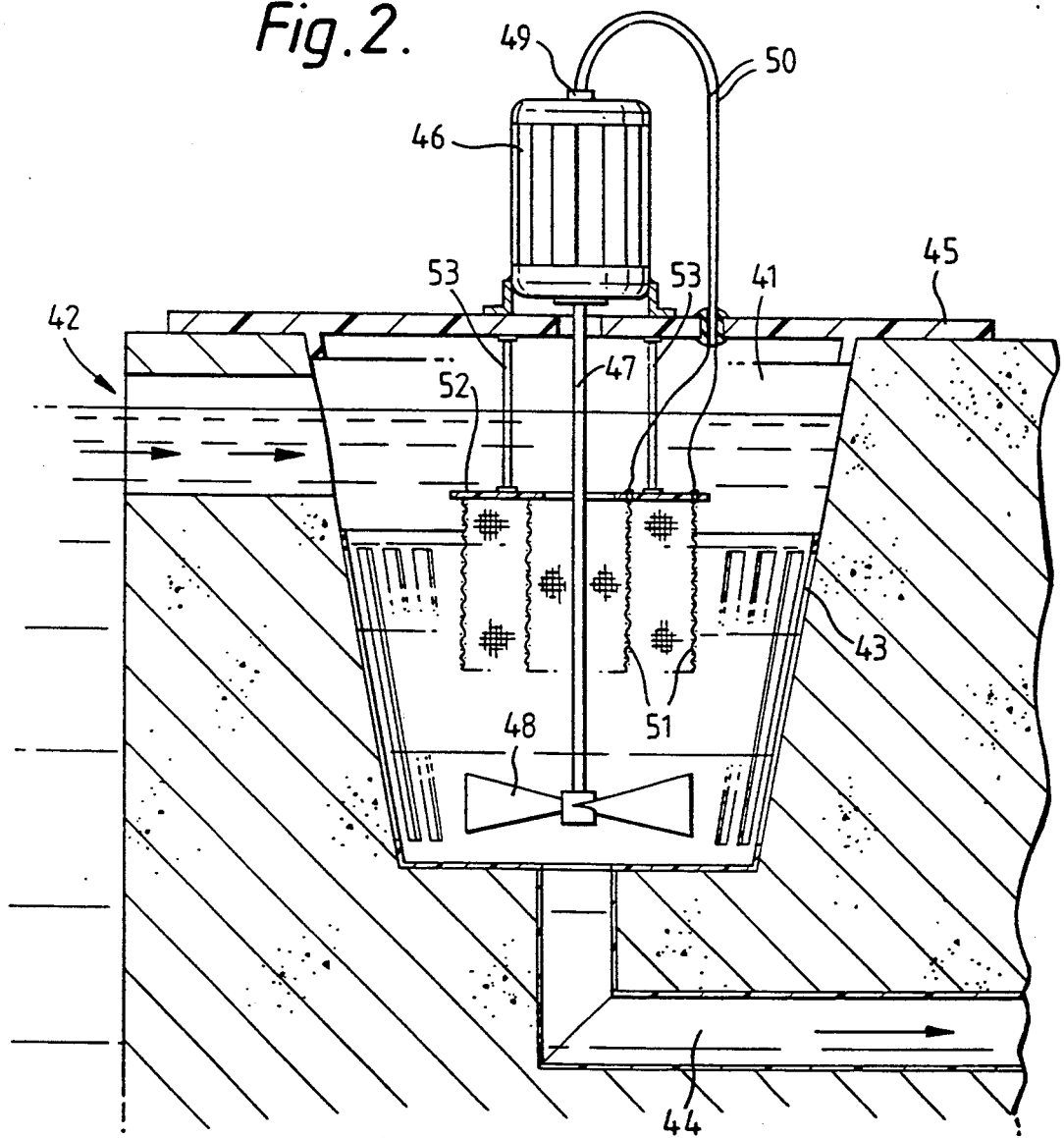
FIG. 2 is a schematic sectional elevation of a chlorinator according to a second embodiment of the invention.

As shown in FIG. 1, the chlorinator 10 of the first embodiment is generally of "mushroom" shape and comprises a cap portion 11 and a stem portion 12. The stem portion 12 is in the form of an inlet spigot which is fitted to the outlet of the return pipe 13 normally located in the wall 14 of a swimming pool. The spigot 12 is preferably threaded into return pipe 13. The inlet spigot 12 is suitably dimensioned and configured to suit the particular outlet to which the chlorinator is to be affixed. Alternatively, the inlet spigot 12 may be of standard shape and size, and an appropriate sleeve (not shown) may be fitted to the outlet 13 to make it compatible with the standard spigot 12.

The flow of water through the return pipe 13 impinges onto an impeller or other water turbine device. In the illustrated embodiment, the impeller is in the form of a vaned waterwheel 15. The waterwheel 15 is mounted on the rotor shaft of an electricity generator which, in the illustrated embodiment, is a sealed dynamo 16. The electrical output of the dynamo 16 is connected by wires 17 to a series of spaced electrodes 18. The electrodes 18 of the illustrated embodiment are annular in shape, and may be formed of titanium mesh or any other suitable electrode material.

The cap 11 and the inlet spigot 12 are suitably formed from plastics material. The centre portion 19 of cap 11 is preferably indented or retroverted as shown in FIG. 1 so as to direct the flow of water from the water wheel 15 through the electrodes 18 and out of a series of apertures 20 provided near the perimeter of cap 11.

In use, the chlorinator 10 is fitted to the outlet of the return pipe 13 of a saltwater swimming pool. The return flow of water in pipe 13 impinges on water wheel 15 causing the wheel to spin. This, in turn, rotates the rotor within dynamo 16 causing an electrical voltage to be generated at the output terminals of the dynamo. This voltage is applied to the electrodes 18 via wires 17. The flow of water continues through the electrodes. Chlorine is generated from the salt water by the energised electrodes 18 in a known manner, and the generated chlorine is conveyed with the water flow through the outlets 20 into the pool.

A light, such as a light emitting diode (LED), may be connected to the output of the dynamo to indicate when the electrodes are energised i.e. when the chlorinator is operating.

A second embodiment of the invention is illustrated in FIG. 2. The chlorinator of this embodiment is designed for use in a chamber or cavity 41 containing the leaf basket 42 of a conventional pool filtration system. This cavity 41 is in fluid communication with the pool via the skimmer box or pool outlet 43. A pipe 44 communicates with the bottom of the cavity 41 and leads to the pump (not shown) of the filtration system. The pump draws water from the pool through the skimmer box or pool outlet 43, through the cavity 41, and into pipe 44. The leaf basket is normally made of mesh, screen or other perforated material and filters out large debris such as leaves. The leaf basket cavity 41 is normally closed by a plastic lid 45.

The chlorinating apparatus of this embodiment comprises an electrical generator or dynamo 46 mounted to the topside of lid 45, and having a shaft 47 protruding downwardly through an aperture in the lid 45. An impeller 48 is mounted on the shaft 47 adjacent the bottom of the cavity 41. The flow of water from cavity 41 to pipe 44 causes impeller 48 to spin, thereby driving the generator 46.

The generator 46 generates a voltage between its output terminals 49 which are connected, by electrical cables 50, to respective electrodes 51. The electrodes 51 are in the form of a concentric pair of tubular mesh electrodes mounted on an annular support member 52 which, in turn, is mounted to the underside of lid 45 by means of connecting rods 53.

In use, the voltage generated at the output of the generator 46 by the spinning of impeller 48 is applied to the electrodes 51 to generate chlorine from the saltwater solution passing through the electrodes. The generated chlorine is carried with the water flow, thereby avoiding accumulation in cavity 41.

The abovedescribed chlorinator is fully self-contained and is mounted on the lid 45. The chlorinator can be installed simply by interchanging the lid.

A third embodiment of the chlorinating apparatus of this invention is illustrated in FIG. 3. The chlorinator 21 illustrated in FIG. 3 is a self-contained buoyant structure adapted to float freely on the water surface of the swimming pool. The chlorinator comprises a circular base 24 surmounted by a transparent plastics cover 22 forming a sealed space therebetween. A plurality of solar cells 23 are provided on the inside of transparent cover 22. The combined voltage output of the solar cells 23 is connected to a series of spaced mesh electrodes 26 mounted beneath the base 24, i.e. the electrodes 26 are immersed in the pool water as the base 24 is designed to float at water level.

The combined voltage output of the solar cells 23 is also connected to a battery 25 located within the sealed housing. During daylight hours when the solar cells 23 are producing a voltage output, the battery is charged, and is then used to power the electrodes 26 at night when the solar cells are inoperative.

In use, the solar-powered floating chlorinator 21 floats around the surface of the pool. During daylight hours, sufficient power is generated by the solar cells 23 to operate the electrodes 26 and charge the battery 25. Chlorine generated by the electrodes 26 from the salt water is distributed to the pool water by convection currents induced through the electrodes 26. At night, the electrodes 26 are switched automatically to the battery 25. As the chlorinator operates for a large proportion of a 24 hour day, only a low rate of chlorine generation is required.

Thus, the solar-powered chlorinator provides a simple and economical means of producing and distributing chlorine in a swimming pool or the like.

In a modified version of this embodiment, the solar cells 23 may be located on top of a structure adjoining the pool, e.g. a gazebo, in a fixed position and connected by electrical cables to electrodes in contact with the pool water by electrical cables.

Figure 4:
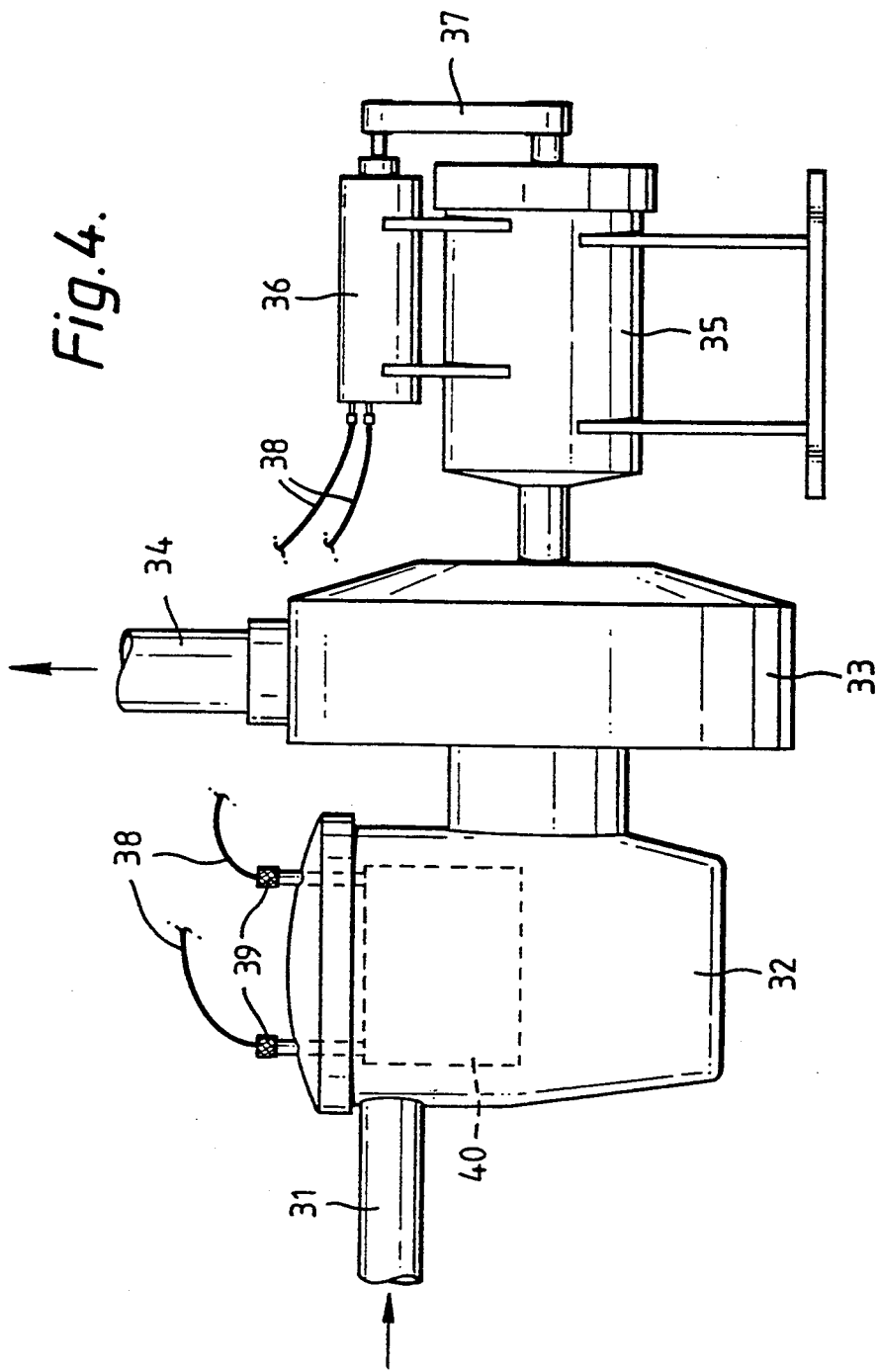
FIG. 4 is an elevational view of a chlorinator according to a fourth embodiment.

A fourth embodiment is illustrated in FIG. 4. A conventional filtration system comprises an inlet pipe 31 which receives water from the pool, typically after having passed through the leaf basket to filter out leaves and other debris. The pool water passes from inlet pipe 31 into an expanded pipe formation or cavity 32 which typically houses a hair and lint filter. After passing through the hair and lint filter, the water is pumped to an outlet pipe 34 by an impeller (not shown) located in pump housing 33. The impeller is mounted on a shaft of an electrical motor 35. The outlet pipe 34 is connected to a filter, such as a diatomaceous earth or sand filter, in which the water is filtered before being returned to the pool.

In this embodiment, electricity generating means 36 is mechanically coupled to, and driven from, the pump motor 35. Typically, the electricity generating means comprises a DC generator, or alternator with rectifier, having its shaft coupled to the shaft of the pump motor 35. For example, the generator shaft may be coupled to the pump motor shaft by a belt drive 37. However, any other suitable method of coupling may be used.

The electrical output of generator 36 is connected by cables 38 to respective terminals 39 of electrode means 40. The electrode means 40 typically comprises a pair of spaced mesh electrodes, such as alloy-coated titanium electrodes. The electrodes 40 are suitably located in the pipe chamber 32 housing the hair and lint pot. Thus, whenever the pump motor 35 is operating, the generator 36 will automatically be driven to power the electrodes 40. The electrodes 40 generate chlorine from the salt water flowing through chamber 32 and the generated chlorine is carried by the water flow to the pool, thereby avoiding accumulation of chlorine at one location.

The abovedescribed chlorinator can be simply retrofitted to an existing or conventional filtration system to replace an existing chlorination system, or to convert a freshwater pool to saltwater chlorination, without substantial change to the pool piping. Further, the chlorinating apparatus does not require a separate power supply, and is activated automatically when the pump motor 35 is operating.

The foregoing describes only some embodiments of the invention, and modifications which are obvious to those skilled in the art may be made thereto without departing from the scope of the invention as defined in the following claims.

For example, the output of the electricity generator of the abovedescribed embodiments can be connected to an underwater light. In this manner, underwater lighting can be provided without substantial wiring or modification to the pool.

The underwater lighting can be provided independently of any chlorination apparatus. In this modification, a housing such as shown in FIG. 1 contains an electrical generator and impeller as depicted. However, the output of the generator is connected to a sealed light fitting. The self-contained light fitting can be easily fitted to the pool return pipe outlet and is powered by the flow of water through the outlet.

I claim:

1. Chlorinating apparatus suitable for use with a saltwater swimming pool having a pump for circulating water between the pool and a filter, the chlorinating apparatus comprising electrical generating means for providing an electrical output, the generating means being driven, in use, by the flow of water produced by the pump; and electrode means electrically connected to the electrical output of the electricity generating means for generating chlorine from the salt water.

2. Chlorinating apparatus as claimed in claim 1, wherein the electricity generating means comprises an electrical generator having a rotatable shaft, and an impeller device mounted on the shaft, the impeller device being rotated in use by the flow of water.

3. Chlorinating apparatus as claimed in claim 2, wherein the chlorinating apparatus is mounted in a housing adapted to be fitted to the outlet of a return pipe to the pool whereby the impeller device is rotated by the flow of water through the outlet.

4. Chlorinating apparatus as claimed in claim 3, wherein the electrode means comprising a set of spaced electrodes located in the housing, the housing have a spigot for connection to the outlet and also being provided with apertures therein whereby, in use, water flow from the outlet passes over the electrodes and through the apertures.

5. Chlorinating apparatus as claimed in claim 2, wherein the pool is provided with a leaf basket chamber having a lip thereon and electrical generator is mounted on the lid of the leaf basket chamber and its shaft extends into the chamber such that, in use, the impeller device is driven by the flow of water through the leaf basket chamber.

6. Chlorinating apparatus as claimed in claim 5, wherein the electrode means comprises a set of spaced electrodes mounted to the underside of the lid and located, in use, in the water within the leaf basket chamber.

7. Chlorinating apparatus suitable for use with a saltwater swimming pool having a filtration system including a pump driven by a motor, comprising
electricity generating means adapted to be coupled to, and driven by, the motor, and
electrode means electrically connected to the output of the electricity generating means for generating chlorine from the salt water.

8. Chlorinating apparatus as claimed in claim 7, wherein the electricity generating means comprises an electrical generator having a shaft mechanically coupled to a shaft of the motor, and the electrode means comprises a set of spaced electrodes located within a chamber associated with the pump, the set of electrodes being mounted on the underside of a lid of the chamber.

9. Chlorinating apparatus for use with a salt water swimming pool, the chlorinating apparatus comprising
solar-powered electricity generating means;
electrode means electrically connected to the output of the electricity generating means for generating chlorine from the salt water; and
rechargeable battery means connected to the electricity generating means so as to be charged thereby, the battery means also being connected to the electrode means.

* * * * *